G. E. BULLOCK.
TIRE.
APPLICATION FILED NOV. 25, 1918.

1,381,105.

Patented June 14, 1921.
2 SHEETS—SHEET 2.

INVENTOR
George E. Bullock
BY
ATTORNEYS.

UNITED STATES PATENT OFFICE.

GEORGE E. BULLOCK, OF DETROIT, MICHIGAN.

TIRE.

1,381,105.  Specification of Letters Patent.  Patented June 14, 1921.

Application filed November 25, 1918. Serial No. 264,122.

*To all whom it may concern:*

Be it known that I, GEORGE E. BULLOCK, a citizen of the United States of America, residing at Detroit, in the county of Wayne and State of Michigan, have invented certain new and useful Improvements in Tires, of which the following is a specification, reference being had therein to the accompanying drawings.

The primary object of my invention is to provide a resilient or yieldable tire for the wheels of vehicles, as an automobile or truck, and attain the same resiliency or yieldability as though a pneumatic tire was used on the wheel, but without punctures, blow-outs and other troubles incident to the use of pneumatic tires.

Another object of my invention is to utilize a series of circumferentially disposed coiled spring in a tire for cushioning the center portion of a wheel, the springs being disposed so as to be placed under compression by a load and all of said springs coöperate in sustaining the load and maintaining the central portion of the wheel concentric of the tire.

A further object of my invention is to provide a vehicle wheel tire wherein the parts are constructed with a view of reducing the cost of manufacture and at the same time retain those features by which durability, ease of assembling and safety are secured. With such ends in view, my invention resides in the novel construction, combination and arrangement of parts to be hereinafter specifically described and then claimed.

Reference will now be had to the drawing, wherein—

Figure 1:
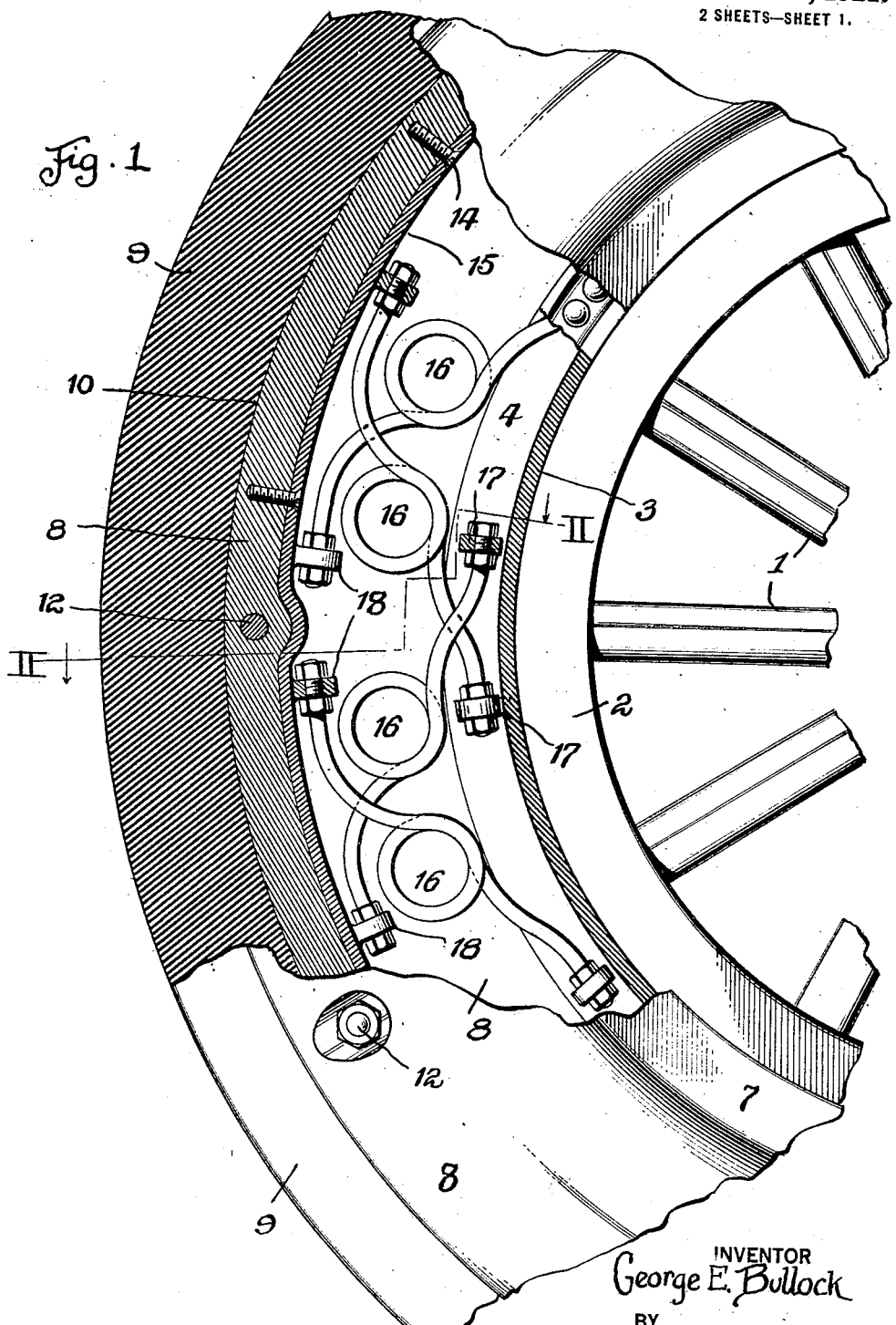
Figure 1 is a side elevation of a portion of a vehicle wheel provided with a tire in accordance with my invention, the tire being partly broken away and partly in section.
Figure 2:
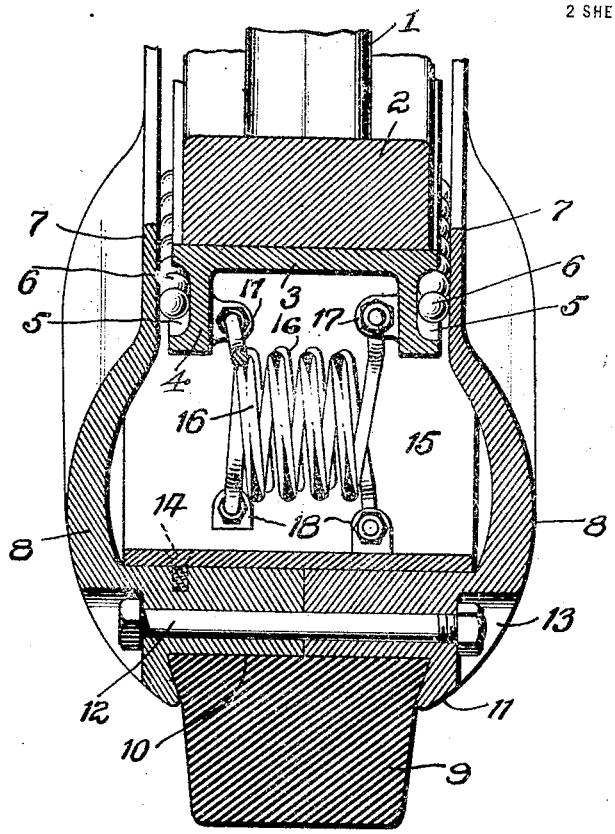
Fig. 2 is a cross sectional view of the tire.
Figure 3:
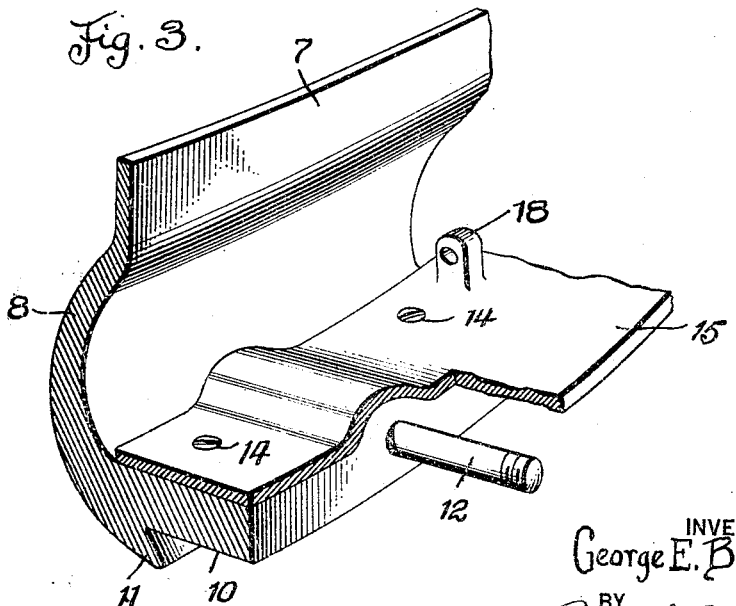
Fig. 3 is a perspective view of a portion of one of the side members thereof.

In the drawings, the reference numeral 1 denotes spokes supporting a felly 2, and fixed on the felly is a channel rim 3 having flanges 4, the rim and flanges producing a rim formation. These flanges have the outer faces thereof provided with circumferential grooves 5 and in said grooves are antifrictional balls 6 that provide anti-frictional bearings for the annular flanges 7 of complemental side members 8, said members being made of metal and coöperating in providing an annular substantially cylindrical support for a solid rubber tire 9.

The side members 8 abut and have the confronting or abutting edges thereof cut away to provide a seat 10 for the tire 9 and clencher edges 11 for holding said tire. The side members 8 are held together by a plurality of tie rods or screw bolts 12 disposed at intervals and transversely of the side members 8 adjacent the tire 9. The tie rods or screw bolts 12 have the heads or nuts thereof disposed in recesses 13 provided therefor in the member 8.

In the members 8 and connected to one of said members as at 14, is a band or ring 15, said ring providing an annular seat and support for the side members 8 and thus coöperating with the tie rods 12 in maintaining the side members in proper relation to afford a closed compartment between the ring 15 and the rim 3. As will be understood these parts, when assembled, produce what may be termed a tire-supporting formation. It is in this annular compartment that a plurality of coiled springs are placed, said springs being designated 16 and having end convolutions thereof connected to lugs 17 of the rim 3 and lugs 18 of the ring 15.

Each spring 16 has its axis extending transversely to the direction of traction, the springs being arranged in pairs with the coil of one spring of the pair located in advance of the coil of the other spring of the pair in the direction of advance of the wheel. The opposite ends of each coil project from the coil, being elongated, one of such ends extending forwardly and the other rearwardly of a plane extending through the coil on a radius of the wheel.

In securing a pair of coils in position, the advance end of one of the coils is secured to the rim formation while the advance end of the other coil is secured to the tire-supporting formation, the rear ends of the coils reversing the order, the two ends of a coil being secured to different formations.

The length of the ends of the several coils is such that when the pair of coils is assembled, the advance end of the rear coil of the pair extends forwardly a distance sufficient to intersect a plane extending through the advance coil of the pair, the plane extending radially of the wheel; and it is preferred that the advance end of the forward coil of the pair project forwardly a distance sufficient to intersect a plane of a coil of the preceding pair of the succession of pairs. The rear ends of these coils are the reverse of this arrangement, in that the rear end of the advance coil of the pair intersects a plane of the rear coil of the pair, while the rear end of the rear coil intersects a plane of a coil of the succeeding pair. As a result, one end of a coil intersects the plane of the other coil of the pair while the opposite end intersects the plane of a coil of the adjacent pair.

In addition, the length of the ends of the coils are such that the angular distance between the points of securing the coil ends of a pair to either of the formations is greater than the distance between the axes of the coils of the pairs. For instance, the advance end of the rear coil and the rear end of the advance coil of a pair are both secured to the tire-supporting formation; the points of securing are spaced apart a greater distance than the distance between the coil axes. Similarly with the advance end of the advance coil and the rear end of the rear coil which are secured to the rim formation; the distance between the points of securing of the latter, however, are greater than the distance between the points of securing of the ends secured to the tire-supporting formation.

As will be understood, and as shown in the drawing, this arrangement provides for the use of lugs on opposite sides of the compartment formed by and between the two formations, the lugs 17 of the rim formation projecting inwardly from the opposite flanges 4, while lugs 18 of the tire-supporting formation project inwardly from ring 15, these lugs being properly positioned to provide for the symmetrical mounting of the springs. Obviously, this provides that the advance coil of each pair is similarly mounted, as are the rear coils of the pairs, the advance end of the rear coil, for instance, having its lug at one side of the ring 15, while the rear end of the advance coil has its lug located at the opposite side of such ring.

This arrangement for connecting the rim formation with the tire-supporting formation to permit of yieldability or relative movement therebetween in the plane of the wheel, provides for efficient service. For instance, with the vehicle to which the wheel is attached, stationary in position, the load weight carried by the main or inner portion of the wheel is placed on the spring connections in a direction radially of the wheel to decrease the distance between the formations at the bottom of the wheel and increase the distance at the top. This has a tendency to unwind the coils at the bottom and wind them at the top. When power is applied to advance the vehicle, the drive of the inner member of the wheel while the outer member is subject to traction resistance, sets up a tortional action between the two formations and which is made effective to drive the assembly through placing a pulling strain on one of the coils of each pair and a pushing strain on the other coils, setting up either a winding or unwinding tendency of the coil depending upon the direction in which the power is being applied.

It is now apparent that the center portion of the wheel is yieldable relative to the ring 15 and the rim 3 may freely ride between the flanges 7 of the side members 8. The antifrictional balls between the flanges 4 and 7 will receive any side or end thrust during the operation of the wheel, and while in the drawing there is illustrated a preferred embodiment of my invention, it is to be understood that the structural elements are susceptible to such variations and modifications as fall within the scope of the appended claims.

What I claim is:

1. The combination with a wheel having a rigid rim formation, a resilient tire therefor, and a tire-supporting formation adapted to maintain the tire in spaced relation to the rim formation, of means for yieldingly connecting the rim and tire-supporting formations, said means including a plurality of independent coil springs each having its axis transverse to the direction of traction, the ends of each coil being elongated to project beyond the coil in directions approximately transverse to the coil axis, one of such ends extending in a direction opposite that of the other end, said ends being secured respectively to the several formations.

2. A combination of the type of claim 1 characterized in that the springs are located in a succession of pairs in the direction of length of the formations, with one coil of a pair in advance of the other coil.

3. A combination of the type of claim 1 characterized in that the springs are located in a succession of pairs in the direction of length of the formations with the advance end of one of the pair of coils secured to the rim formation, the advance end of the other coil of the pair being secured to the tire-supporting formation.

4. A combination of the type of claim 1 characterized in that the springs are located in a succession of pairs in the direction of length of the formations, with the advance end of the rear coil of a pair extending forwardly a distance sufficient to intersect a plane extending through the advance coil of the pair.

5. A combination of the type of claim 1 characterized in that the springs are located in a succession of pairs in the direction of length of the formations, with the advance end of the rear coil of a pair extending forwardly a distance sufficient to intersect a plane extending through the advance coil of the pair, the rear end of such rear coil extending rearwardly a distance sufficient to intersect a radial plane extending through a coil of the succeeding pair of coils.

6. A combination of the type of claim 1 characterized in that the springs are located in a succession of pairs in the direction of length of the formations, with the advance end of one of the coils of a pair and the rear end of the other coil of the pair secured to the same formation.

7. A combination of the type of claim 1 characterized in that the springs are located in a succession of pairs in the direction of length of the formations, with the advance end of one of the coils of a pair and the rear end of the other coil of the pair secured to the same formation, such ends projecting from the respective coils sufficiently to cause the end of one coil to intersect a radial plane extending through the other coil.

8. A combination of the type of claim 1 characterized in that the springs are located in a succession of pairs in the direction of length of the formations, with the advance end of one of the coils of a pair and the rear end of the other coil of the pair secured to the same formation, the angular distance between the points of connection of the coil ends with one formation being greater than the similar distance between the securing points of the opposite ends of the coils with the other formation.

9. A combination of the type of claim 1 characterized in that the springs are located in a succession of pairs in the direction of length of the formations, with the advance end of one of the coils of a pair and the rear end of the other coil of the pair secured to the same formation, the angular distance between the points of securing of such ends being greater than that between the axes of the respective coils of the pair.

In testimony whereof I affix my signature in the presence of two witnesses.

GEORGE E. BULLOCK.

Witnesses:
KARL H. BUTLER,
ANNA M. DORR.